Figure 2:
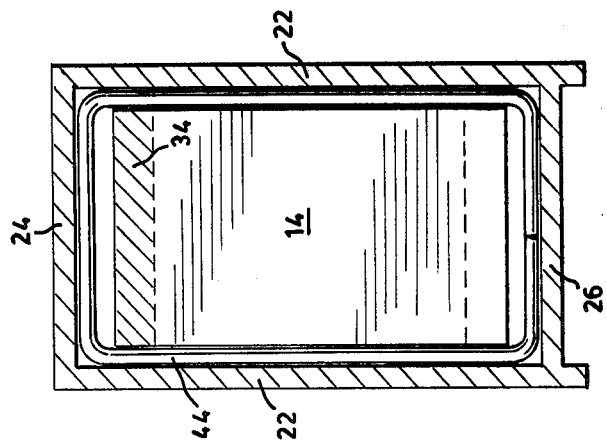

United States Patent [19]

Farrell

[11] 4,435,665

[45] Mar. 6, 1984

[54] THERMAL LINEAR ACTUATOR

[76] Inventor: Kent Farrell, 93 Churchill Rd., Baie D'Urfe, Quebec, Canada

[21] Appl. No.: 390,269

[22] Filed: Jun. 21, 1982

[51] Int. Cl.³ ............................................ H02N 10/00
[52] U.S. Cl. ...................................... 310/307; 318/117
[58] Field of Search ......................... 310/306, 307, 26; 318/117, 135

[56] References Cited

U.S. PATENT DOCUMENTS

| 3,138,749 | 6/1964 | Stibitz | 318/117 X |
| 3,439,199 | 4/1969 | Bergstrand et al. | 310/26 |
| 3,460,015 | 8/1969 | Hines | 318/117 |

Primary Examiner—Donovan F. Duggan
Attorney, Agent, or Firm—Fetherstonhaugh & Co.

[57] ABSTRACT

A thermal linear actuator assembly comprises, a plurality of primary linear expansion members, a plurality of secondary linear expansion members having a substantially different coefficient of expansion to that of the primary members, the primary and secondary members being alternately arranged in a side-by-side array and serially connected at opposite ends thereof, the array including first and last members each having a free end for attachment to opposite actuator attachment points whereby the thermal linear motion of the free ends in use is proportional to the total summed length of all members of the array.

4 Claims, 2 Drawing Figures

THERMAL LINEAR ACTUATOR

FIELD OF INVENTION

This invention relates to thermal linear actuators. In particular, this invention relates to a thermal linear actuator device which is compact and is capable of providing substantial linear motion.

PRIOR ART

Thermal linear actuators have been known for many years wherein linear motion is achieved by heating and cooling an actuator member having a substantial co-efficient of expansion. For any selected material, the extent of linear motion which can be achieved is proportional to the length of the actuator member. Thus, where a substantial degree of linear motion is required in order to provide an actuator, it may be necessary to provide a long thermal actuator member. In many applications where thermal actuators are required, it is important that they be as compact as possible. The requirement for a compact structure is clearly inconsistent with the requirement for increased linear motion and difficulty has been experienced in attempting to increase available linear motion while minimising the proportions of the actuator.

I have found that a compact thermal linear actuator can provide a substantial actuator motion by arranging a plurality of bimaterial thermal linear actuators in a side-by-side relationship and connecting the bimaterial actuators in series.

SUMMARY OF INVENTION

According to one aspect of the present invention, the thermal linear actuator assembly comprises a plurality of primary linear expansion members, a plurality of secondary linear expansion members having a substantially different co-efficient of expansion to that of said primary members, said primary and secondary members being alternately arranged in a side-by-side array and serially connected at opposite ends thereof, said array including first and last members each having a free end for attachment to opposite actuator attachment points whereby the thermal linear motion of the free ends in use is proportional to the total summed length of all members of the array.

PREFERRED EMBODIMENT

Figure 1:
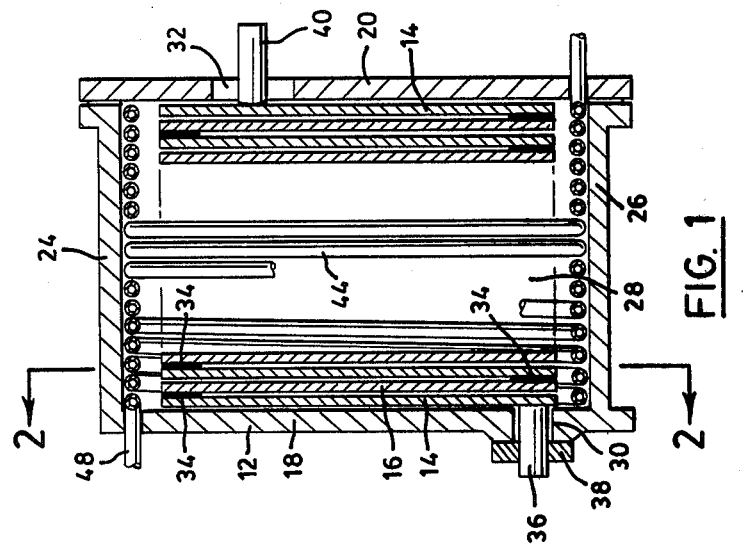

The invention will be more clearly understood after reference to the following detailed specification read in conjunction with the drawings wherein:

FIG. 1 is a sectional side view of a thermal linear actuator constructed in accordance with an embodiment of the present invention; and FIG. 2 is a sectional end view of the actuator of FIG. 1.

With reference to the drawings, the reference numeral 10 refers generally to a thermal linear actuator assembly constructed in accordance with an embodiment of the present invention. The assembly consists of a housing 12, a plurality of primary linear expansion members 14 and a plurality of secondary linear expansion members 16.

The housing 12 has a pair of oppositely disposed end walls 18 and 20, side walls 22, an upper wall 24 and a lower wall 26. An expansion chamber 28 is formed within the housing 12. A passage 30 opens outwardly through the end wall 18 and an elongated passage 32 opens through the end wall 20.

A plurality of primary linear expansion members 14 and secondary linear expansion members 16 are alternately arranged in a side-by-side array and serially connected along narrow attachment areas 34. A shaft 36 is secured at the proximal end of a first of said primary linear expansion members 14 and projects through the passage 30 in the end wall 18. A locking collar 38 is mounted on the shaft 36. An actuator shaft 40 is mounted adjacent the distal end of the last primary linear expansion member 14 and projects through the elongated slot 32 so as to be movable relative to the housing 12 in a direction of the arrows A in response to heating and cooling of the thermal linear actuator assembly.

It will be noted that the primary and secondary linear expansion members are serially connected such that the distal end of the first secondary member is connected to the distal end of the first primary member and the proximal end of the first secondary member is connected to the proximal end of the third primary member. Preferably, the primary linear expansion members 14 are made from a material having a high co-efficient of expansion and the secondary members are made from material having a low co-efficient of expansion. Examples of suitable material from which the expansion members having a high co-efficient of expansion may be manufactured are as follows: aluminum, copper, brass or the like.

Examples of suitable materials from which the expansion members having a low co-efficient of expansion may be formed are as follows: Invar, graphite/epoxy composite.

The thermal linear actuator assembly may be activated as a result of temperature changes induced by its immediate environment or it may be activated as a result of temperature changes induced by a heater or cooler mounted on or within the actuator chamber. To this end, coils 44 are mounted within the chamber 38. A heating or cooling fluid may enter the input end 46 of the coil and be discharged through the discharge end 48 of the coil.

The primary and secondary linear expansion members each comprise a thin, flat strip of material having a length L, width W, a thickness T and a combined breadth B. For any given array side area $A \times B$, linear motion is maximised by making the strips as thin as possible. Maximum output force for any temperature change, which occurs at xero motion is proportional to strip cross-sectional area $T \times W$ multiplied by the averaged moduli of elasticity for the two materials and is inversely proportional to the total summed lengths of all the members.

As previously indicated, operation of the actuator is by means of a change in its temperature. This change in temperature may result from a change in the environment or may be induced through the heating and cooling coils. The result of a temperature change is that the primary and secondary linear expansion members expand or contract. By reason of the fact that the two materials have different thermal expansion co-efficients, motion is produced at the output end of the actuator. This motion is proportional to the temperature change multiplied by the difference in expansion co-efficients and its direction is governed by the material which has the larger co-efficient of expansion.

From the foregoing, it will be apparent that the thermal linear actuator of the present invention is capable of providing a substantial degree of linear motion at its output end while being of a compact configuration.

These and other advantages of the structure of the present invention will be apparent to those skilled in the art.

I claim:

1. A thermal linear actuator assembly comprising;
   (a) a plurality of primary linear expansion members,
   (b) a plurality of secondary linear expansion members having a substantially different coefficient of expansion to that of said primary members,
   (c) said primary and secondary members being alternately arranged in a side-by-side array and serially connected at opposite ends thereof, said array including first and last members each having a free end for attachment to opposite actuator attachment points whereby the thermal linear motion of the free ends in use is equal to the total linear expansion/contraction of the primary members less the total linear expansion/contraction of the secondary members of the array.

2. An actuator assembly as claimed in claim 1 further comprising a housing having an actuator chamber, said array of members being mounted in said chamber, said housing being adapted to permit free movement of at least one of said free ends in response to temperature variations, said one free end being exposed for attachment as aforesaid.

3. An actuator assembly as claimed in claim 1 further comprising thermal control means for adjusting the temperature of said linear expansion members to extend or retract the array as required in use.

4. A thermal linear actuator assembly comprising;
   (a) a plurality of primary linear expansion members each comprising a flat length of a first material, each primary length having a proximal end and a distal end,
   (b) a plurality of secondary linear expansion members each comprising a flat length of a second material, each secondary length having a proximal end and a distal end, said second material having a substantially different coefficient of expansion to that of said first material,
   (c) said primary and secondary members being alternately arranged in a side-by-side array with the distal end of each primary member connected to the distal end of an adjacent secondary member and the proximal end of each primary member connected to the proximal end of the next adjacent secondary member,
   (d) a housing supporting said array,
   (e) a first of said members having one of its ends so as to be free movable relative to a free end of a last of said members of said array whereby the thermal linear motion of one free end relative to the other is equal to the total linear expansion/contraction of the primary members less the total linear expansion/contraction of the secondary members of the array.

* * * * *